United States Patent [19]

Peterson

[11] Patent Number: 4,859,187
[45] Date of Patent: Aug. 22, 1989

[54] DATABASE MANAGEMENT ENHANCEMENT DEVICE

[76] Inventor: Richard E. Peterson, 537 Valley St., San Francisco, Calif. 94131

[21] Appl. No.: 884,482

[22] Filed: Jul. 11, 1986

Related U.S. Application Data

[63] Continuation-in-part of Ser. No. 672,473, Nov. 19, 1984, abandoned.

[51] Int. Cl.$^4$ .............................................. G06F 3/14
[52] U.S. Cl. ..................... 434/118; 434/108
[58] Field of Search ....................... 434/108, 109, 118; 273/148 A; 40/122, 124, 124.2

[56] References Cited

U.S. PATENT DOCUMENTS

| | | | |
|---|---|---|---|
| 864,254 | 8/1907 | Perkins | 40/1 |
| 1,004,935 | 10/1911 | Taylor | 273/150 |
| 1,599,732 | 9/1926 | Westermann | 40/124.2 |
| 2,081,520 | 5/1937 | Warner | 273/148 A |
| 2,965,978 | 12/1960 | Olson | 434/108 X |
| 3,863,371 | 2/1975 | Shertenlieb | 40/124.2 |

OTHER PUBLICATIONS

Antonoff, M., "Using a Spreadsheet as a Data Base", Personal Computing, pp. 65-71, Feb. 1986.
J. B., "A History of the Graphic Interface", Personal Computing, p. 65, Jan. 1986.
"Key in Innovation, Leader Says", Info World, pp. 22-23, May 20, 1985.
Smith, "Crisis Management Under Strain", Science, p. 907, vol. 225, Aug. 31, 1984.

Primary Examiner—David A. Scherbel
Assistant Examiner—Creighton Smith
Attorney, Agent, or Firm—Bielen and Peterson

[57] ABSTRACT

An enhancement device for database management systems utilizing a board or screen format having an array of cells with a set of mnemonic icons selctively positioned as portals to associated keys identifying records in the database, the set of icons preferably consisting of common playing cards arrangeable in a mnemonic composite.

17 Claims, 2 Drawing Sheets

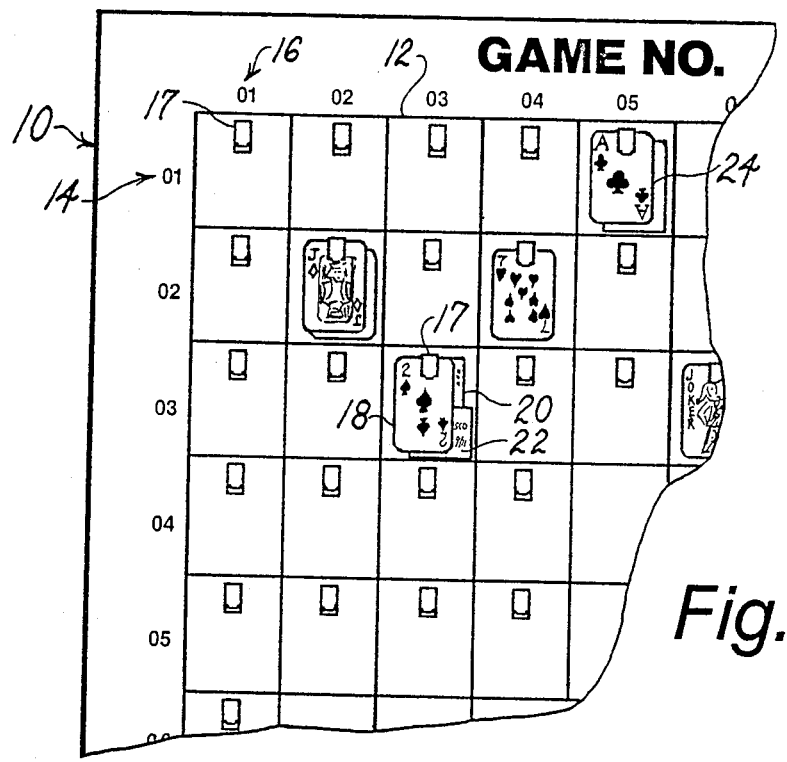
Fig. 1
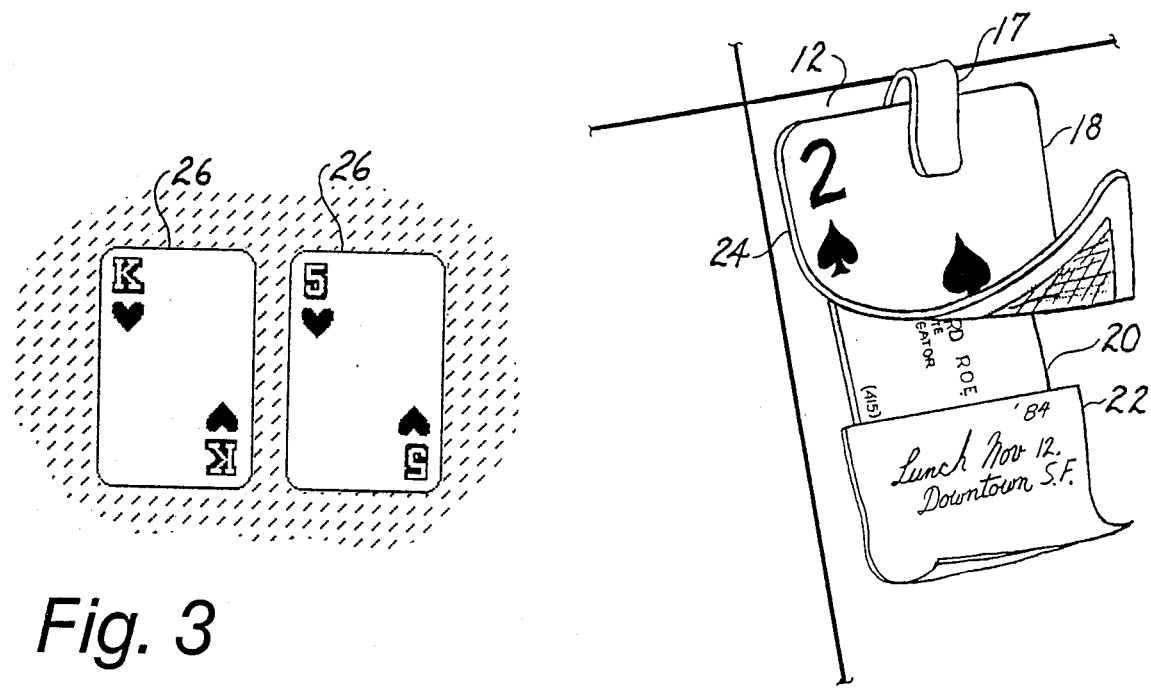
Fig. 3
Fig. 2

DATABASE MANAGEMENT ENHANCEMENT DEVICE

BACKGROUND OF THE INVENTION

This application is a continuation-in-part of my application entitled "DATA BASE MANAGEMENT ENHANCEMENT DEVICE," Serial No: 672,473, Filed 19 November 1984, now abandoned. The invention generally relates to a data processing system for organizing and sorting information.

This invention relates in particular to a device to enhance database management systems by utilizing a board or screen format having an array of cells with a set of mnemonic icons selectively positioned as portals to associated keys for records in a database. The set of icons preferably consists of a deck of cards, particularly common playing cards having a natural order and intrinsic associative value.

As computers become available to virtually all classes of people, certain conventions must be formulated in order that users unfamiliar with programming can effectively utilize computers with minimal instruction. Since the struggle for hardware and software standards is expected to continue unabated, certain bridging software will be devised to vertically and horizontally link hardware and software from different sources. Additional software will be devised to bridge the digital operating computers with the analog thinking operators. The subject invention is designed as bridging device enabling the intuitive organizing power of the user to be linked with the ordering and storing capabilities of the computer. Although primarily devised as a mnemonic for database management the format device can be advantageously applied to the development of universal cross-links.

In conventional computerized database management systems, the database is divided into discrete records where each record has a key for identifying and locating the record. The key may be a title or code which is used for indexing and addressing records in the database.

Management of the database is customarily accomplished with an index to correlate the database and location of records with the key. Additional pointers and relational information may be appended to the key, such as, a descriptive title, abstract, and classification of the subject matter, related topics and other cross information to other records. When the index is altered or the database sorted, for simplicity the records do not usually change their physical storage location.

Aside from indexes, collective displays in database management systems are usually confined to tables. A table is customarily a row and column format with the identification of the record, for example the title, making up the rows, and specified data fields which are defined data sets making up the columns. The cells formed by the rows and columns contain the extracted information defined by the fields for the appropriate record.

Other software emphasizes window techniques for "overlaying" or "tiling" the screen with images from different sectors of integrated programs for user manipulation. Frequently, graphically generated representative icons are used in menu selections. While these state of the art developments enhance the capabilities and user friendliness of the personal computer, they do not make a concerted use of existing icons sets as the format for database management and manipulation with the purpose of enhancing user comprehension and recall.

SUMMARY OF THE INVENTION

The enhancement device of this invention for database management enables a user to form a visual composite of multiple selected records for presentations in a layout on a board or screen. The layout utilizes a multiple cell format, with selected cells containing a discrete mnemonic icon associated with an underlying record key. The icon forms a recognizable portal or door to the record identification key behind it. For maximum utility the icons are unique and freely exchangeable to enable any icon associated with a key to be switched with a different icon as deemed suitable. Furthermore, the icon together with its associated key are freely moveable in the cell format to any unoccupied cell such that a select icon pattern or order can be effected to form an interrelational composite. The interrelational composite will itself comprise a mnemonic.

Preferably the icons are a set of playing cards, for example, a deck of common playing cards where each card is unique. The common playing card provide fifty three discrete icons, which can be expanded by further select identification means to differentiate multiple descs, for example a red and blue deck providing 106 unique icons.

Because of the intrinsic historic associative nature of playing cards, a natural mnemonic logic can be custom developed by the user, first in associating a particular card with a particular record through its key, and second in selective positioning of the cards in the cell array to form an interrelational composite. In the latter case, the card pattern or arrangement itself provides a mnemonic aid for user recall of the scope and interrelationship of the underlying database.

For a simple database, as exemplified by the mechanical model, it may be convenient for the underlying database record to follow the key from cell to cell. In situations where large amounts of data are stored it may be more economical for the key alone, with associated pointers, to shift cell location as is customary in most conventional database management systems during a record sort operation.

These and other features of the database enhancement device will become apparent on consideration of the preferred embodiments of the invention.

BRIEF DESCRIPTION OF THE DRAWINGS

FIG. 1 is a fragmented plan view of a 100 cell memo board.

FIG. 2 is an enlarged partial view of a card package in a cell.

FIG. 3 is a typical computer generated graphic representation of cards.

DETAILED DESCRIPTION OF THE PREFERRED EMBODIMENTS

Figure 5:
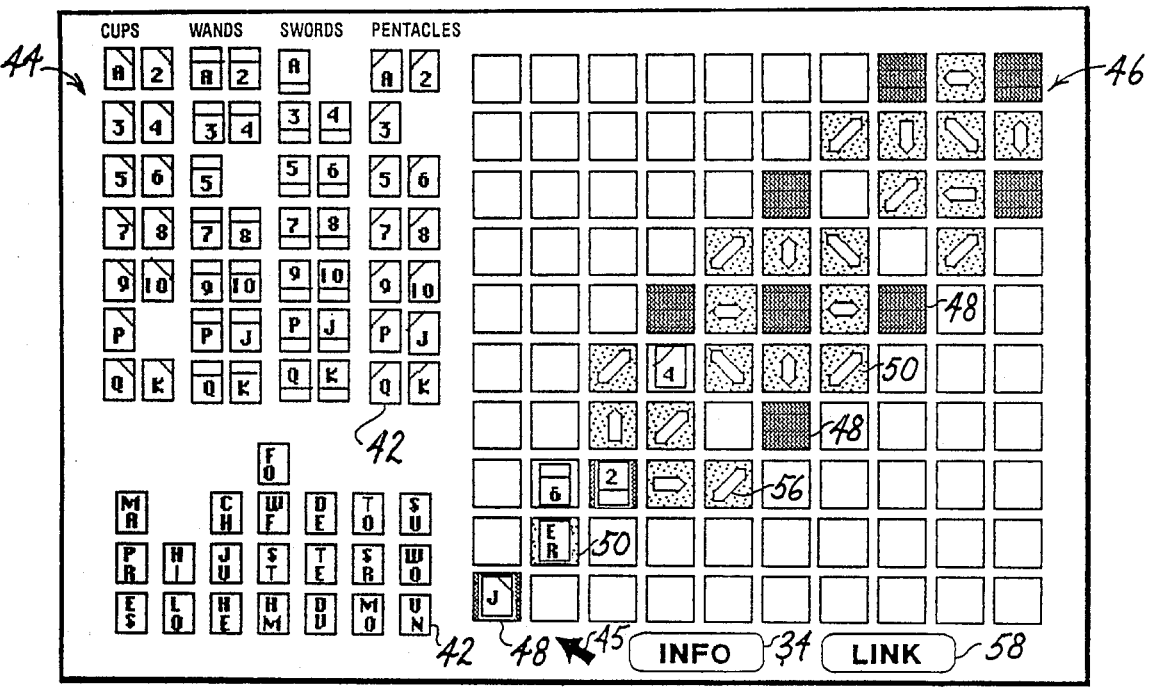
FIG. 5 is a view of a screen display of a second embodiment of the invention.

Referring to FIGS. 1 and 2 mechanical model of the database enhancement device is shown is shown utilizing the concepts of this invention applied to a memo board designated generally by the reference numeral 10.

The memo board has a layout comprising an array of cells 12, here 100 cells in a grid pattern with horizontal and vertical identifiers, 14 and 16, employed in combination to discretely address each cell. Each cell has a plastic clip 17, a common stationary store item, glued to the top of the cell to retain cards and paper slips. Located in selected cells in a user devised arrangement and held by the clips are individual miniature playing cards 20. Attached to the business cards are small, adhesively backed memo slips 22, for example a sheet from the Post-It ® Note Pad of 3M Company. The individual's name on the business card 20, comprises an effective key for the related underlying data written on the memo slip 22. Here the attached memo slip forms the complete database record associated with the key. Where a larger base is required for the record, a conventional file cabinet is used with folders keyed to the name, or to locational pointers added to the business card for accurate access of externally stored folders.

In use, the memo board can provide a composite display of the user's desired card arrangement, each card having an associative connection with the underlying business card. For example, members of an organization can be associated with playing cards according to their rank in the organization as it best relates to the traditional hierarchical rank of the playing cards. By appropriate arrangement of the cards in discrete cells on the memo board, for example in the manner of a corporate organizational chart, an associative relationship is established in the composite.

Additional playing cards and their associated business cards and memo slips, collectively called card packages 24 can be added to the board in vacant cells. The card packages 24 can be shifted from one cell to another vacant cell. The overlying playing card can be switched with existing placed cards or switched with unused reserve cards as deemed appropriate in order that the composite icon representation expresses the user's desire for his preferred arrangement for recall. The address identifiers are useful to communicate cell locations and are employed to record the locational placement of card packages when all cards packages in one board composite are removed, for example in setting up new organizations. The recorded placement allows the original composite to be reset after clearing of the board.

While the above memo board is useful for organizing relatively simple data such as the data inherent on a business card or added thereto on a memo slip, the concepts are equally applicable to enhancement software for database management systems in computer applications. The equivalency of the composite to a file, the business card to the record kay and the memo slip to the record is readily apparent. In this case the cards as icon portals are a coded buffer between the file and the key. The memo board is replaced by a computer screen where a graphically generated layout of cells enables playing cards 26 as shown in FIG. 3 to occupy cells in manner equivalent to the direct placement of cards on the board layout. Simple operational commands can assign cards to selected cells. Additional operational commands can make the desired exchanges and shifts. Focus on a particular cell using window procedures can permit the icon portals, to be opened to reveal the associated key. On a full screen display of the dey, auxiliary information such as titles, address pointers, abstracts, relational information, etc. and if called, the underlying database record can be presented. Computers having touchscreen capabilities such as the HP-150 or at least a mouse for quick cell access are preferred. Graphics as produced by CBS Software, Inc. in "Learning Bridge" are suitable to generate card representations.

Using existing state of the art software such as "Framework" from Ashton Tate, and "Graphics Environment Manager" from Digital Research, Inc., the subject database enhancement device can be constructed by the skilled programmer.

"Filevision" by Telos Software Products (1984), incorporated herein by reference, is an unique visual filing software for the Apple, "Macintosh" that let's one work with information in pictures as well as numbers and text. Using "Filevision" as an enabling applications program, a format template embodying the concepts of the devised data base enhancement device can be readily constructed.

Figure 4:
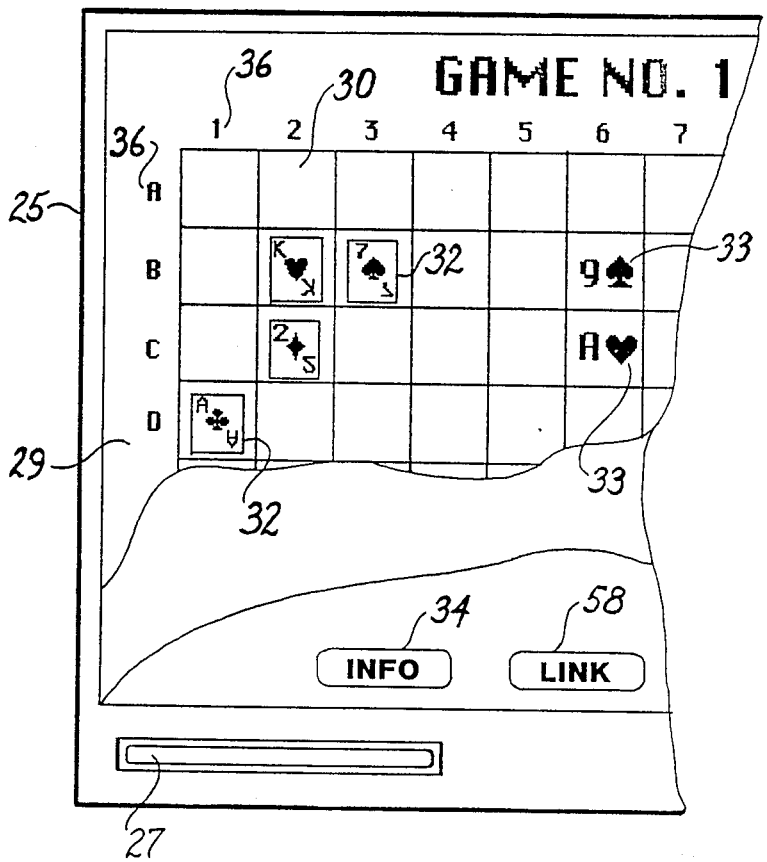
FIG. 4 is a partial view of a screen display of one embodiment of the invention.

For example, in the partial view of FIG. 4, a general purpose computer 25, preferably the Mcintosh, is programmed with a graphic database applications program 27, preferably Filevision, and a cell format is generated on the computer screen 29. A seven cell by twelve cell field was produced using the program's alignment grid as a guide for constructing the cells 30 with the mouse guided pointer and the program's drawing toolbox. Conventional playing card representations 32 are constructed using the program's symbols editor for denomination and suit and the rectangle tool from the tool box for the card outline. Alternately, the four symbols for hearts, clubs spades and diamonds are easily created, preserved in the symbol menu for repeated use, and coupled with numerals or letters from the text menu to form short hand card representations 33 as shown in FIG. 4. Each card created as an object can be named. As in our mechanical example, the name or key is the name of the individual represented by the card. Data about the individual key is entered and stored in the fields of the data form which is reached by selecting the "INFO" command 34 which is on the main display screen generated by the program.

Card representations can be created in any cell, or moved from cell to cell using the binding feature of the menu and dragging the card with the pointer from one cell to another. In FIG. 4 cells are identified by row and column indicia 36 which may be used for identification or recording purposes. The format, of course, is not limited to organizing information only about individuals and is applicable to any information. The use of individuals is nevertheless a convenient subject for application of the data base enhancement device.

In the more elaborate example of FIG. 5, the cells 38 are created as discrete boxes 40 by the use of the rectangle object in the program's toolbox. As objects, each cell can link accompanying information about the cell itself, particularly any significance about the location of the cell, upon selecting the cell and the INFO command. Because of the limitations of the monitor size, miniature playing cards 42 (in this case 78 tarot cards) are individually represented and differentiated by letters or numerals, together with identifying indicia. For example a strategically positioned horizontal or diagonal line distinguishes suits of the minor arcana and dual letters distinguish the 22 cards of the major arcana.

The cards are displayed in a bank 44 for selection and may be moved by the mouse pointer 45 to any cell by selecting with the pointer, binding the elements of the object, and dragging the card icon to the cell desired as shown by the examples.

It has been found that, as with many other tasks, it is difficult to begin formation of a meaningful mnemonic composite on an empty matrix. To the masters of rhetoric the significance of "loci" was equally as important as image in constructing a mnemonic format. the Roman authorities on rhetoric developed an architectural technique for imprinting the memory with a series of places corresponding to the rooms of a grand building.

In choosing a fixed architecture for initiating a card patter, applicant was mindful of the hermetic association of tarot cards to the kabala. The kabalist's "Tree of Life" is an extraordinary structure that suggests to the computer systems engineer, a network tree for hardware or software architecture. Used as a mnemonic path, the network tree is agreeably limited in complexity and rich with historic significance. Curiously, on representing the node structure of the Kabala network in block form, the configuration suggests the common hopscotch game pattern, which allegedly is of unknown pre-Christian origin. The pattern was likely, and remains, an effective procedural tutorial.

Remarkably, in fitting a full block representation of the kabala tree diagram in the preferred ten cell by ten cell field 46, with a single node 48 or a single link 50 dedicated to a single cell, the suggested network tree 52 fits exactly in a diagonal swath from one corner to an opposite corner. The preferred arrangement of this novel block configuration is shown in FIG. 5 with the beginning node in the square of the lower left corner 54.

The unique pattern formed can be displayed using background shading from the Filevision program to represent nodes 48 and links 50 and vector arrows 56 to suggest the particular nodes that are connected by the links, which in certain instances are displaced from the interconnected nodes. While other cells may accommodate link representations, the resultant pattern shown seemed both aesthetically pleasing and the best arrangement for clarity, recognizing the limitations of the transposition from the original diagram to the block diagram.

Constructing each node and each link as an object in the Filevision program enables descriptive information about each loci to be carried in the "INFO" format provided by the program for designated objects. This is useful in establishing attributes to each loci as desired.

In use, one might assign the ten most important information packets or records to the ten nodes in an ascending order of some significance. The link cells might be reserved for information packets relating to the relationships between the primary information packets with the remaining cells used for other branch information packets.

As intended, the arangement of cards representing records is as important as the assignment of cards to the records in developing an effective mnemonic. The central tree diagram sweeping through the cell grid is devised to provide a simple foundation architecture for constructing a memory palace in conformity with the theme of this invention. The core diagram may be used as an outline format, or simply ignored in constructing the mnemonic composite. It is nevertheless available to provide a simple childhood hopscotch pattern to break a mental block in initiating a card composite.

Figure 6:
FIG. 6 is a view of enlarged card representation.

The exemplar templates described in FIGS. 4 and 5, use the enabling applications software, Filevision and have practical limitations of small size and absence of color. The limitation of size is partially accommodated by a program menu linking operation, which, on selecting a miniature card representation in the composite and the "LINL" command 58, enables display of a full-size, detailed card 60 as shown n FIG. 6. The limitation of color requires the addition of a color monitor and adaptation software for implementation.

As a further feature, a dictionary of standard characteristics or aspects about the card can be compared with similar field aspects about the data record, using Filevision highlight menu operations to aid in selection of an appropriate card to represent a given record.

A more elaborate "expert system" is however preferred, using query techniques to aid or effect both selection of cards and placement of cards in the filed according to predetermined criteria compatible with the mnemonic valuations of the user.

Essentially, the techniques involved in this invention are best described as information cramming, where data is structured in memory organization packets, or tokens and the tokens of indefinite value are compared with coins (the cards) of preexisting value. The tokens and matched coins are then arranged together in some meaningful arrangement in frames, here the cells of the grid structure. Cramming forces real world information to fit the images and structure of an artificial model. A heuristic template is formed with familiar playing cards in a familiar rank and file field, preferably with reference to a familiar hopscotch diagram. The resultant composite reduces complex information to mnemonic format that is a common denominator and easily remembered.

The common denominator aspect is useful in communicating an organized composite of data from person to person, or in providing a common ground between different databases for formatting an exchange of information.

Because the icon portals comprise an effective buffer between the file and the key, the enhancement software may include an expanded buffer capability with an intermediate memory and conversion ability for operating as an interprogram file format between foreign database management systems. Whether produced as a crossroads program or solely as a mnemonic device, the software can be tailored for users with minimal computer sophistication.

The device invented is primarily a mnemonic device, however, it is also inherently a simple coding system which allows subjects or records to be conveniently discussed or communicated using common code symbols. While other icon sets might be suggested, such as chess pieces, the playing card set is greatly preferred because each card is unique and in general, user's have a greater familiarity with cards and their intrinsic associative capabilities. While the device has particular application to personnel records, with appropriate insight the device can be used for any type of records where a helpful association can be made between the playing card and the record. The system is particularly adapted for adversary situations where a composite can be developed dividing the cell array into opposed camps with cards arranged in a strategic formation that is a parody of the actual conflict.

While in the foregoing embodiments of the present invention have been set forth in considerable detail for the purpose of making a complete disclosure of the invention, it may be apparent to those of skill in the art that numerous changes may be made in such detail without departing from the spirit and principles of the invention.

What is claimed is:

1. A database management enhancement device comprising:
   a format layout having an ordered array of discrete visual display cells,
   a database having discrete records with the records having an associative interrelationship and with each record having a discrete record identifying key,
   a set of mnemonic icons wherein the set of icons comprises representations of a deck of conventional, individually unique playing cards having a hierarchical order and intrinsic associative value,
   wherein discrete card representations are associated with select record keys according to an intrinsic association between the card representation and the record identified by the selected record key wherein a mnemonic association is formed between the card representation and the record, and
   wherein the associated card representations are positioned and displayed the format layout according to an interrelationship of the records wherein a mnemonic composite of discrete card representations is formed that is suggestive of the associative interrelationship among selected records of the database.

2. The device of claim 1 wherein the cards are common playing cards.

3. The device of claim 1 wherein the cards are tarot cards.

4. The device of claim 1 including means to move discrete card representations and their associated keys from one cell to another.

5. The device of claim 1 including means to switch card representations from one key to another.

6. The device of claim 4 wherein the means to switch card representations from one key to another comprise conventional operational commands of a computer applications program.

7. The device of claim 5 wherein the means to switch card representations from one key to another comprise conventional operational commands of a computer applications program.

8. The device of claim 1 wherein the format layout is graphically displayed by a programmed general computer having having a computer screen.

9. In a data processing system having a database with discrete records, the records having an associative interrelationship and each record having a discrete record identifying key, a database management enhancement device comprising:
   a format layout having an ordered array discrete visual display cells with a set of mnemonic icons selectively positionable and displayable in the cells, wherein the positioned and displayed icons form mnemonic portals for access of associated record identifying keys for records of the database, wherein the set of icons comprises representations of a conventional deck of individually unique playing cards having a hierarchical order and intrinsic associative value, wherein discrete records are selected and discrete card representations are selected and associated with the record keys of the selected records in a manner that forms a mnemonic association between each selected card representation and each selected record, and the card representations are positioned and displayed in select cells in the format layout in a manner that forms a mnemonic composite suggestive of the associative interrelationship of the records for recalling both the record and the interrelationship of the records.

10. The data processing system of claim 8 wherein the cell array includes a card composite guide diagram patterned after a hopscotch game pattern.

11. The data procesing system of claim 8 wherein the cell array includes a card composite guide diagram patterned after a kabala tree diagram.

12. The data processing system of claim 11 wherein the kabala tree diagram includes ten nodes and twenty-two links, each node and each link being dedicated to a separate cell.

13. The data processing system of claim 12 wherein the kabala tree diagram comprises a network arranged from one corner of a network grid to the diagonally opposite corner of the network grid in a ten cell by ten cell rank and file grid.

14. A method of organizing interrelated records of a conventional database for mnemonically recalling selected records and their association with other selected records comprising:
   constructing an ordered array of visual display cells,
   applying discrete record identifying keys to each of the records in the database,
   selecting records from the database,
   associating discrete mnemonic icons from a set, wherein the set of icons comprises representations of a conventional deck of individually unique playing cards having a hierarchical order and intrinsic associative value, with discrete record identifying keys of the selected records in accordance with a mnemonic association between the card representations and the selected records, and,
   selectively positioning and displaying the card representations associated with the record keys in discrete cells of the array in accordance with an associative interrelationship of the records such that the resulting arrangement of discrete card representations forms a visual mnemonic composite suggestive of the associative interrelationship among the selected records of the database.

15. The method of claim 14 wherein the playing cards are common playing cards.

16. The method of claim 14 wherein the playing cards are tarot cards.

17. The method of claim 14 wherein the array is an organization of cells into a grid pattern, each cell having an address designated by a row and column position in the grid pattern.

* * * * *